(12) United States Patent
Schweiger et al.

(10) Patent No.: US 11,728,582 B2
(45) Date of Patent: Aug. 15, 2023

(54) GROUNDING CLIP WITH ANTI-ROTATION PROTECTION

(71) Applicant: MD ELEKTRONIK GmbH, Waldkraiburg (DE)

(72) Inventors: Florian Schweiger, Isen (DE); Walter Lang, Waldkraiburg (DE); Sabrina Schnobrich, Waldkraiburg (DE); Hubert Huber, Kirchdorf (DE); Markus Huber, Kirchdorf (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 26 days.

(21) Appl. No.: 17/502,058

(22) Filed: Oct. 15, 2021

(65) Prior Publication Data

US 2022/0149604 A1 May 12, 2022

(30) Foreign Application Priority Data

Nov. 6, 2020 (DE) ..................... 20 2020 106 373.1

(51) Int. Cl.
*H01R 4/64* (2006.01)
*H02G 3/30* (2006.01)

(52) U.S. Cl.
CPC ................. *H01R 4/64* (2013.01); *H02G 3/24* (2013.01)

(58) Field of Classification Search
None
See application file for complete search history.

(56) References Cited

U.S. PATENT DOCUMENTS

| 10,020,618 | B2 * | 7/2018 | Miyoshi ............... H01R 13/648 |
| 2006/0189184 | A1 | 8/2006 | Onuma |
| 2017/0155200 | A1 | 6/2017 | Yamamoto et al. |

FOREIGN PATENT DOCUMENTS

| DE | 102006008056 B4 | 10/2013 |
| DE | 112013000558 T5 | 11/2014 |
| DE | 102016223522 A1 | 6/2017 |

\* cited by examiner

*Primary Examiner* — Ross N Gushi
(74) *Attorney, Agent, or Firm* — Leydig, Voit & Mayer Ltd.

(57) ABSTRACT

A grounding clip for fastening and electrically contacting two cables to a separate surface includes a plate having a first and second longitudinal edges opposite each other and extending in a first direction, and first and second transverse edges opposite each other and extending perpendicularly to the longitudinal edges in a second direction. First and second cable fastening regions for fastening and electrically contacting first and second cables to the plate extends along the first and second transverse edges, respectively. An opening is arranged between the cable fastening regions for inserting a fastener. First and second tabs extend between the first and second cable fastening regions in parallel to the first and second transverse edges, respectively, and perpendicularly to a plane of the plate in a direction of an underside of the plate.

15 Claims, 8 Drawing Sheets

GROUNDING CLIP WITH ANTI-ROTATION PROTECTION

CROSS REFERENCE TO RELATED APPLICATION

This application claims benefit to German Patent Application No. DE 20 2020 106 373.1, filed on Nov. 6, 2020, which is hereby incorporated by reference herein.

FIELD

The present invention relates to a grounding clip for fastening and electrically contacting two cables to a separate surface.

BACKGROUND

Grounding clips are used in the automotive industry to fix electrical lines or cables in a vehicle at specific locations and to connect, i.e., ground, the ground line of a cable to the vehicle body. Cables that are laid in a vehicle are, for example, antenna lines for an antenna radio and may be coaxial cables. As a result of the fixing, the cable is laid through the vehicle on a predetermined path. The connection of the ground line of the cable to the vehicle body, which is or must be electrically conductive, sets the potential of the ground line to the ground potential of the body and thus grounds the line.

In previous applications, a single grounding clip each was used for fixing two, in particular parallel, cables, wherein the two grounding clips were plugged into one another during installation in the vehicle. However, the use of two individual grounding clips increased the complexity in the installation of the sets of lines in a vehicle.

Publication DE 10 2006 008 056 B4 describes a grounding plate for fixing and grounding coaxial cables. The grounding plate has at least one plate, at one end of which two coaxial cables can be received. At a distance from the receiving region of the coaxial cables, the plate has a screw hole through which a screw is guided in order to fix the grounding plate. If torques occur at the grounding plate, for example due to tensile forces at the cables, the screw connection at the screw hole may be unintentionally loosened or detached.

SUMMARY

In an embodiment, the present disclosure provides a grounding clip for fastening and electrically contacting at least two cables to a separate surface. The grouding clip includes a plate having a first longitudinal edge and a second longitudinal edge opposite the first longitudinal edge, wherein the first and second longitudinal edges extend in a first direction of the plate, and a first transverse edge and a second transverse edge opposite the first transverse edge, wherein the first and second transverse edges extend perpendicularly to the first and second longitudinal edges in a second direction of the plate. A first cable fastening region for fastening and electrically contacting a first cable to the plate extends along the first transverse edge. A second cable fastening region for fastening and electrically contacting a separate second cable to the plate extends along the second transverse edge. An opening is arranged between the first and second cable fastening regions for inserting a fastener. A first tab extends between the first and second cable fastening regions in parallel to the first transverse edge and perpendicularly to a plane of the plate in a direction of an underside of the plate. A second tab extends between the first and second cable fastening regions in parallel to the second transverse edge and perpendicularly to the plane of the plate in the direction of the underside of the plate

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
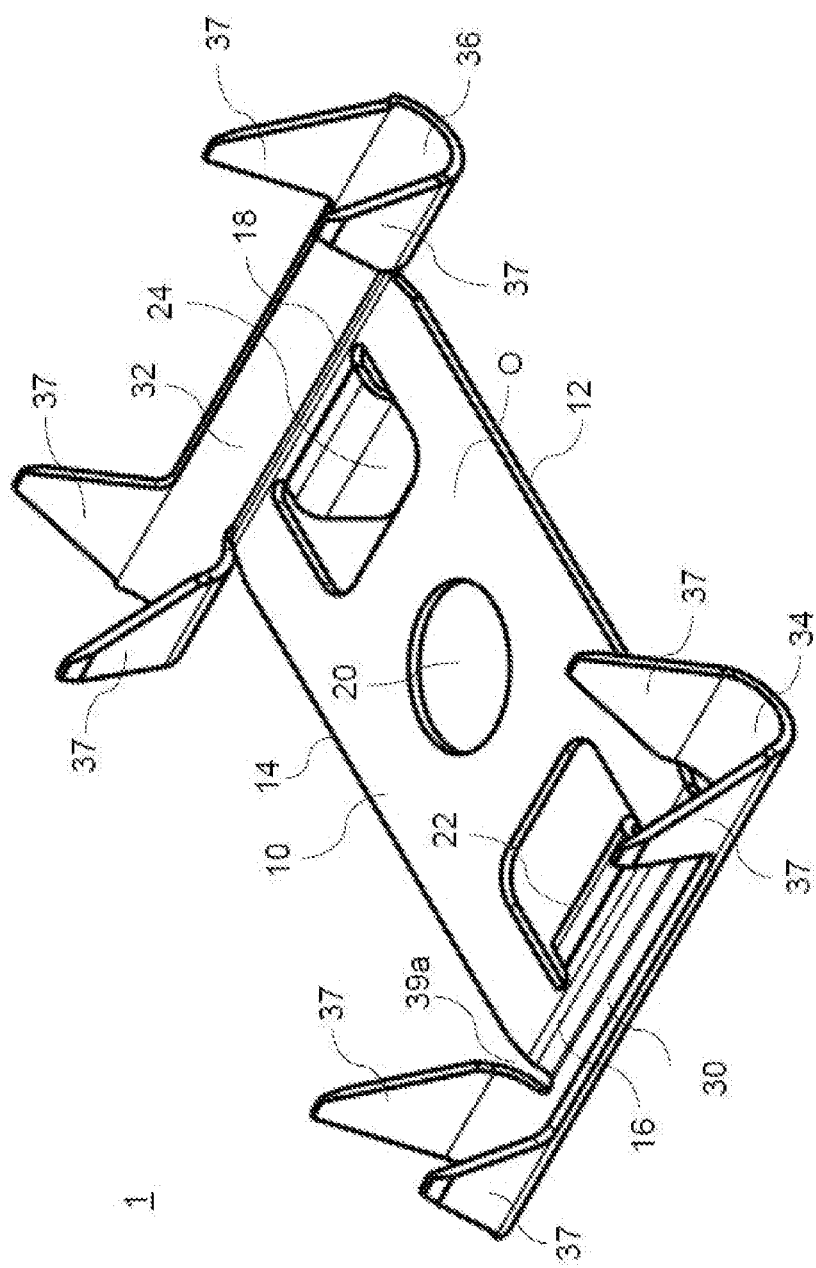
FIG. 1 shows an isometric view of a first embodiment of a grounding clip according to the present invention.

In an embodiment, the present invention provides for at least two cables a grounding clip that is easy to install and prevents undesired loosening or detachment of the grounding clip.

A grounding clip for at least two cables that is easy to install and prevents undesired loosening or detachment of the grounding clip is in particular achieved according to an embodiment of the present invention by a grounding clip for fastening and electrically contacting the at least two cables to a separate surface. The grounding clip has a plate having a first longitudinal edge and a second longitudinal edge opposite the first longitudinal edge, wherein both longitudinal edges extend in a first direction of the plate. Along with a first transverse edge and a second transverse edge opposite the first transverse edge, wherein both transverse edges extend perpendicularly to the first and second longitudinal edges in a second direction of the plate. Furthermore, the grounding clip has a first cable fastening region for fastening and electrically contacting a first cable to the plate, wherein the first cable fastening region extends along the first transverse edge. Along with a second cable fastening region for fastening and electrically contacting a separate second cable to the plate, wherein the second cable fastening region extends along the second transverse edge. Moreover, the grounding clip has an opening arranged between the first and second cable fastening regions for inserting a fastening means (a fastener), a first tab extending between the first and second cable fastening regions in parallel to the first transverse edge and perpendicularly to the plate plane in the direction of an underside of the plate, and a second tab extending between the first and second cable fastening regions in parallel to the second transverse edge and perpendicularly to the plate plane in the direction of the underside of the plate.

The grounding clip is manufactured as a one-piece component. Two separate cables can thus be fastened and electrically contacted with only one grounding clip. This saves time during installation, and the number of components is reduced in comparison to, for example, an arrangement of two individual grounding clips for one cable each. The at least two cables preferably run in parallel to one another in the region of the grounding clip. At the grounding clip, the two cables are furthermore held at a distance that corresponds to a side length of the grounding clip. This distance prevents undesired entanglements of the two cables. In addition, the two cables are received in cable fastening regions. For a simplified cable receptacle, the cable fastening regions each have a cable guide and at least two U-shaped or V-shaped receiving regions comprising at least two crimp tabs each. The receiving regions each having at least two crimp tabs are also the crimping regions for fastening the cables to the grounding clip.

The opening in the plate of the grounding clip makes it possible to insert or pass through a fastening means, such as a screw or a bolt. The grounding clip can be easily, quickly and securely fastened to a separate surface via the fastening means. The opening is preferably arranged centrally between the first and second cable fastening regions. Since the opening lies in the center between the two cable fastening regions, the grounding clip is space-saving and compact overall.

The first and second tabs protrude from the plate, in particular perpendicularly, in the direction of the underside of the plate. The planar shape of the two tabs makes it possible to prevent the grounding clip from rotating, in that the two tabs preferably abut flush against another surface or recess and are thus impeded from rotational movement. In the installed state, the two tabs form an anti-rotation protection for the grounding clip. In addition, due to the arrangement of the tabs between the first and second cable fastening regions, any lever actions occurring during the attempt to rotate the grounding clip are small or they do not occur. Undesired torques on the grounding clip, which may cause lever actions, may occur due to movements or forces on the cables fastened to the grounding clip.

Optionally, the first tab extends along the first transverse edge and the second tab extends along the second transverse edge. In this embodiment, the tabs protruding from the plate makes it possible for the two tabs to be inserted into corresponding recesses in a separate surface, on which the grounding clip is to be arranged. The corresponding recesses in the separate surface are configured such that they each receive a tab in a torsion-proof manner. The tabs of the grounding clip, which are inserted into the corresponding recesses on the separate surface during installation and which cannot rotate, prevent the entire grounding clip from rotating relative to the separate surface.

Optionally, the first tab extends at a first distance from the opening between the opening and the first transverse edge and the second tab extends at the first distance from the opening between the opening and the second transverse edge, so that the grounding clip can be arranged with the first and second tabs in a torsion-proof manner on a part of a fastening means that can be arranged in the opening. In one embodiment, the fastening means is preferably a bolt with a bolt nut. The bolt nut that can be installed on the bolt is preferably arranged in a positive-locking manner between the first and second tabs. This embodiment enables the grounding clip to be placed onto a bolt with a bolt nut in a torsion-proof manner. The angular outer shape of the bolt nut, e.g., an octagonal shape, fits with two opposite edges precisely between the first and second tabs of the grounding clip and prevents, blocks, a rotational movement of the tabs and thus of the grounding clip. In addition, by placing the grounding clip onto a bolt nut in a torsion-proof manner, no recesses are necessary for the tabs as anti-rotation device in the separate surface.

Optionally, the opening is circular. During installation of the grounding clip, the radially symmetrical circular shape has the advantage that the grounding clip can initially be plugged independently of its horizontal orientation onto a vertically aligned fastening means. After plugging onto the fastening means, the grounding clip can be aligned into its final installation position by a simple rotational movement. This facilitates the installation of the grounding clip.

Optionally, the grounding clip has an electrically conductive material, so that an electrical connection exists between at least one fastenable electrical cable and the fastening means that can be inserted into the opening. The fastening means preferably also has an electrically conductive material. Due to the electrical conductivity of the grounding clip, the ground line of the at least one cable fastened to the grounding clip may be connected to the ground of the separate surface, e.g., a vehicle body, via the fastening means.

Optionally, the grounding clip is constructed mirror-symmetrically to a mirror axis, and the mirror axis extends in parallel to the first and second transverse edges through the center point of the opening. Due to the mirror-symmetrical structure, at least two possibilities exist for installing the grounding clip in its respective end position. This increases the flexibility during installation. Furthermore, forces occurring due to pushing and/or pulling movements on the cables can compensate one another due to the mirror-symmetrical structure, so that effectively no or only slight torques occur at the grounding clip. Undesired loads on the grounding clip are thus avoided, whereby the service life of the grounding clip is increased.

Optionally, the first and second cable fastening regions each have a cable guide and at least one first and one second crimping region at opposite ends of the respective cable guide. The cable guide facilitates the arrangement of the respective cable in the cable fastening region. The arrangement of two crimping regions each at opposite ends of a cable fastening region increases the safety of the fastening by redundancy and at the same time ensures the parallel alignment of the two cables in the region of the grounding clip. The parallel alignment prevents the undesired touching or rotating of the two cables.

Optionally, the plate is an elongated plate, and the first direction is the longitudinal direction of the plate. The elongated plate shape gives the grounding clip an easily recognizable orientation, so that the installation of the grounding clip is facilitated, with the matching alignment of the two tabs with respect to the corresponding openings in the separate surface or the edges of the bolt nut.

The descriptions made with reference to the figures are to be understood purely by way of example and not of limitation.

FIG. 1 shows a first embodiment of the grounding clip 1. The grounding clip has a rectangular plate 10 with a first and a second longitudinal edge 12, 14 in the longitudinal direction X, and a first and a second transverse edge 16, 18 in the transverse direction Y perpendicular to the longitudinal direction X. The edges 12, 14, 16, 18 of the plate 10 are viewed without the cable fastening regions 30, 32. In another embodiment, the plate 10 may also have a square shape.

The grounding clip 1 is configured to receive one cable each, preferably a coaxial cable, in a respective cable fastening region 30, 32. The first or second cable fastening region 30, 32 respectively extends along the first or second transverse edge 16, 18 of the plate 10. A crimping region 38a, b, c or d is arranged at each end of a cable fastening region 30, 32 in the transverse direction Y (see FIG. 2). In order to fasten a cable to the grounding clip 1, the cable is aligned in the first or second cable fastening region 30, 32. A first or second cable guide 34, 36 simplifies the arrangement of the cable. Furthermore, the crimping regions 38a, b, c, d have a U-shaped or V-shaped taper toward the cable guide 34, 36 of the respective first or second cable fastening region 30, 32. The taper is formed in each crimping region 38a, b, c, d by at least two opposite crimp tabs 37. A length of the crimp tabs 37 is preferably adapted to the cable thickness. The thicker the at least one cable to be fastened is, the longer are the corresponding crimp tabs 37. In order to fasten a cable, the crimp tabs of both crimping regions 38a, b and 38c, d are bent toward the cable center and the cable is crimped with the crimp tabs. The crimping regions 38a, b, c, d preferably have a structured surface in order to achieve a better, in particular more durable, fastening during crimping. As a result of crimping, the cable is firmly connected to the grounding clip 1. The crimped crimp tabs 37 may furthermore have direct contact to a ground line of the cable. The ground line of the cable was preferably stripped in the crimping regions 38a, b or 38c, d for this direct contact. The direct contact leads to an electrical connection of the ground line of the cable and the grounding clip 1.

Furthermore, the grounding clip 1 may be fastened to a separate body or a surface via a fastening means, such as a screw or a bolt, which is guided through the opening 20 on the plate 10. The fastening means, such as the grounding clip 1, is preferably electrically conductive and in particular made of metal. Due to the electrical conductivity of the components, an electrical connection can be established between the cables fastened to the grounding clip 1, in particular the ground lines of the cables, and the surface on which the grounding clip 1 is fastened.

Figure 2:
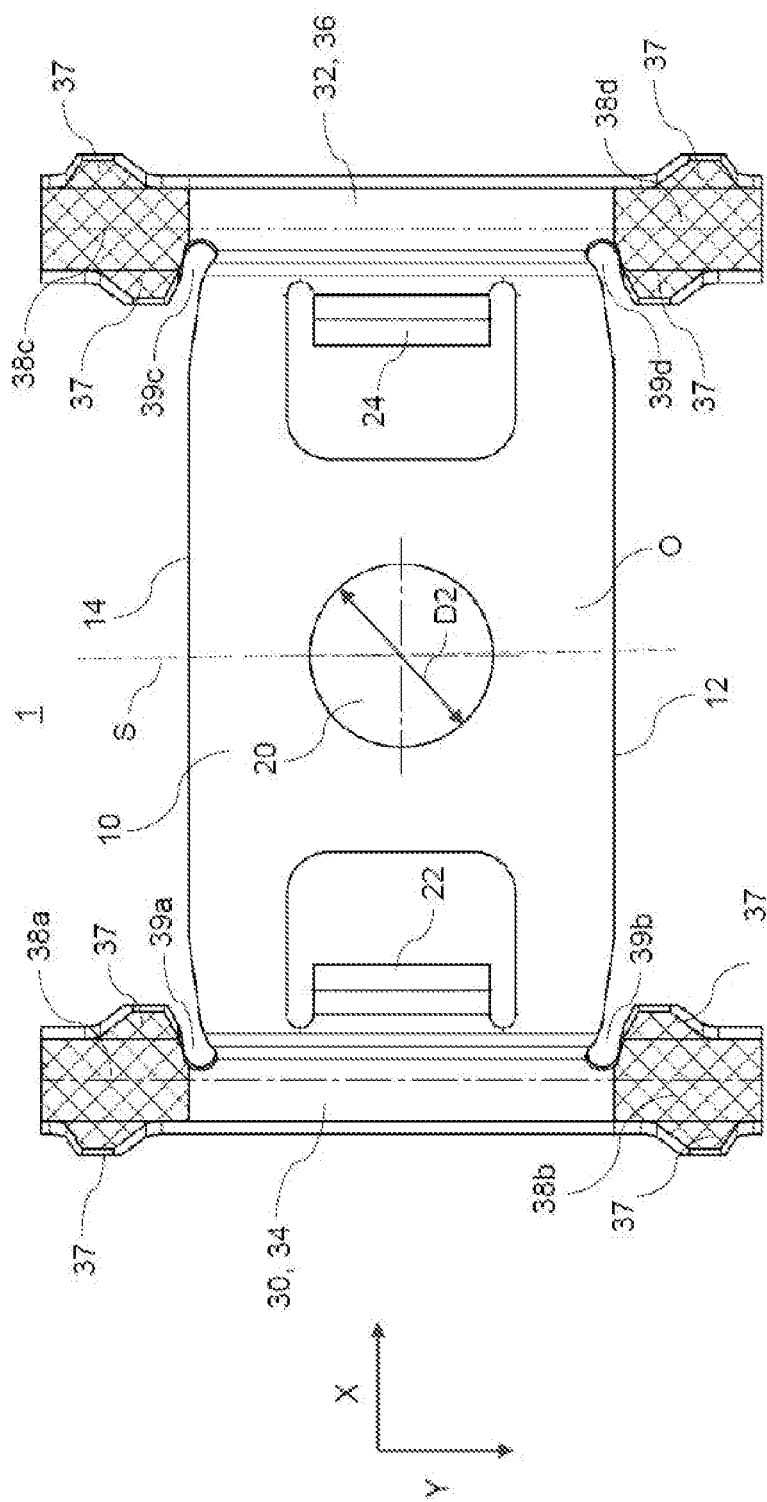
FIG. 2 shows a plan view of the first embodiment.

FIG. 2 shows a plan view of the first embodiment of the grounding clip 1. The grounding clip 1 is symmetrical to a mirror axis S. The mirror axis S passes through the center point of the opening 20 and is parallel to the two transverse edges 16, 18. As a result of the symmetrical structure, the two cable fastening regions 30, 32 run in parallel to one another at a distance that corresponds to the length of the first or second longitudinal edge 12, 14. The distance between the cable fastening regions 30, 32 is the maximum possible distance with respect to the plate 10. Furthermore, the opening 20 runs precisely in the center of the plate 10, whereby a compact size of the grounding clip 1 is achieved.

The symmetrical structure of the grounding clip 1 furthermore compensates or prevents torques that may occur when tensile forces act on the cables and/or the distances between each cable and the opening 20 are different.

FIG. 2 furthermore shows an offset of opposite crimp tabs 37. This offset improves the result of crimping and strengthens the fastening of the cables to the grounding clip 1. A clearance 39a, b, c, d in the respective crimping region 38a, b, c, d in particular improves the crimping result, since it allows the material to flow during the crimping process.

The opening 20 has a diameter D2. The diameter D2 is adapted to the fastening means to be used and preferably receives the fastening means in a radially flush manner. The diameter D2 of the first embodiment and the diameter D2 of a second embodiment may be different. The diameter D2 of the second embodiment is preferably greater than the diameter D2 of the first embodiment. A larger diameter enables the insertion of a thicker fastening means, which, with the same quality, is more stable.

Figure 3:
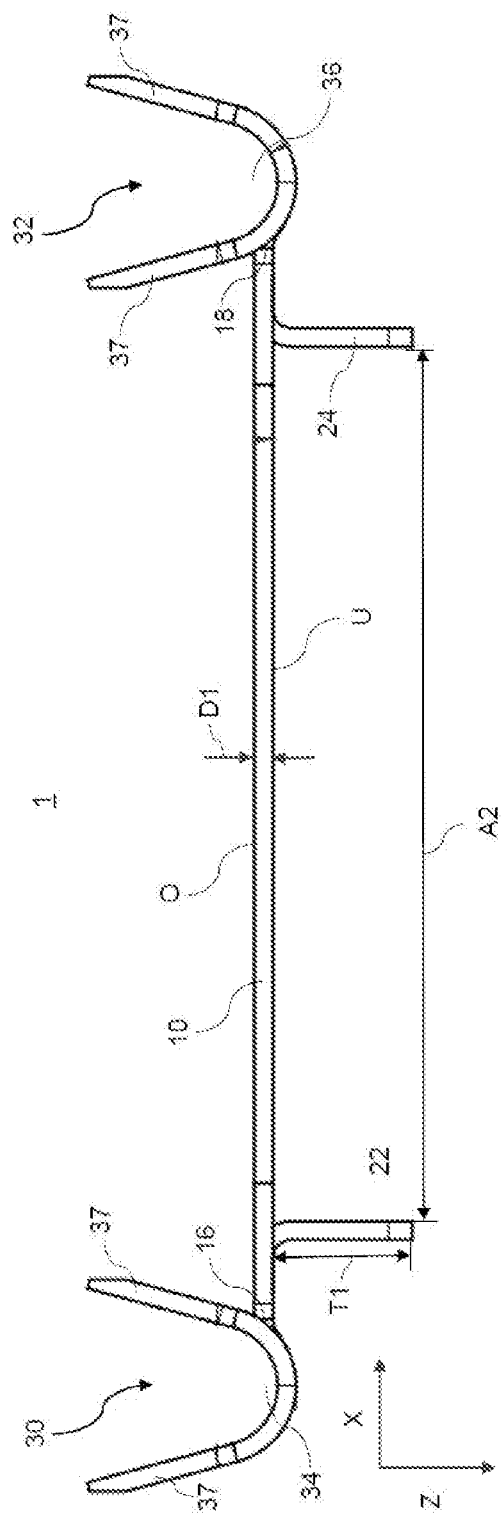
FIG. 3 shows a side view of the first embodiment along a first direction.

FIG. 3 shows a side view of the first embodiment of the grounding clip 1, so that a part of the underside U of the grounding clip 1 is visible. The plate 10 has a thickness D1. The thickness D1 also corresponds to the thickness of the tabs 22 and 24. The tabs 22 and 24 are preferably formed by bending subregions of the plate 10. The first and second tabs 22, 24 are identical. Both tabs protrude from the plate 10 with a depth T1, i.e., the length of the tabs 22, 24 in a direction Z toward the underside U of the plate 10 corresponds to the depth T1. Overall, both tabs form a rectangular, planar shape of a first width B1 in the first embodiment and a second width B2 in a second embodiment. The first and second widths B1, B2 may be identical. The tabs 22, 24 preferably protrude perpendicularly from the plate 10. An inclination of the tabs 22, 24 of up to 10 degrees in both directions from the plate normal is possible in another embodiment.

In the first embodiment, the first and second tabs 22, 24 are inserted into corresponding recesses in the separate surface during the installation or fastening of the grounding clip 1 onto a separate surface. The recesses are essentially flush with a tab, so that a tab cannot move or can only move insignificantly in the recess. The grounding clip 1 thus rests on the separate surface in a torsion-proof manner. When tightening a fastening screw as a fastening means, the grounding clip is in particular held in its position in a torsion-proof manner.

Furthermore, in the first embodiment, the two tabs 22, 24 are bent directly at the respective transverse edge 16, 18 in the direction of the underside U of the plate 10. The distance between the first cable fastening region 30 and the first tab 22 in a first direction or longitudinal direction X is as small as possible. The same applies to the distance between the second cable fastening region 32 and the second tab 24. Due to the small distances of the tabs 22, 24 from the cable fastening regions 30, 32, a possible lever arm attached to a cable fastening region 30, 32 is greatly shortened or impeded between the cable fastening region 30, 32 and the fastening means in the opening 20. Torques at the grounding clip 1 that may occur due to tensile forces on the cables can thus be prevented. In addition, possibly occurring horizontal tensile forces are distributed at the clip to at least three points, i.e., the fastening means in the opening 20 and the two tabs 22, 24 in the corresponding recesses, which leads to a reduction in the load on the grounding clip 1 and to a longer service life.

Figure 4:
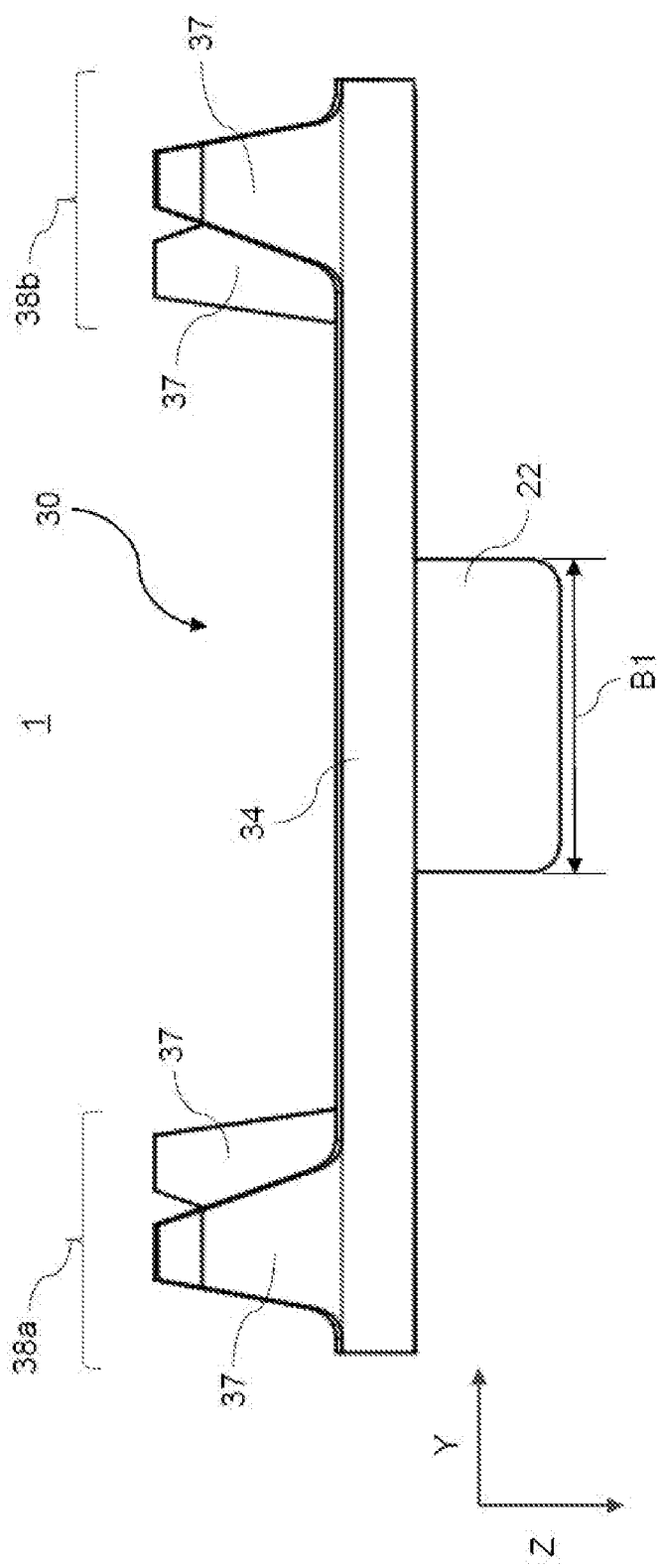
FIG. 4 shows a side view of the first embodiment along a second direction.

The first and second cable fastening regions 30, 32 in FIG. 3 have a U-shaped or V-shaped cross section. The legs of the U or V shape are formed by the at least two adjacent crimp tabs 37, each in a crimping region 38a, b, c, d. A connecting piece between respectively adjacent crimp tabs 37 at the level of the plate 10 forms a cable guide 34, 36 in the form of a groove. The groove facilitates the cable arrangement. The cable guide 34, 36 in the form of a groove connects the respectively two crimping regions 38a, b or 38c, d to one another in each cable fastening region 30, 32 (see FIG. 4).

Figure 5:
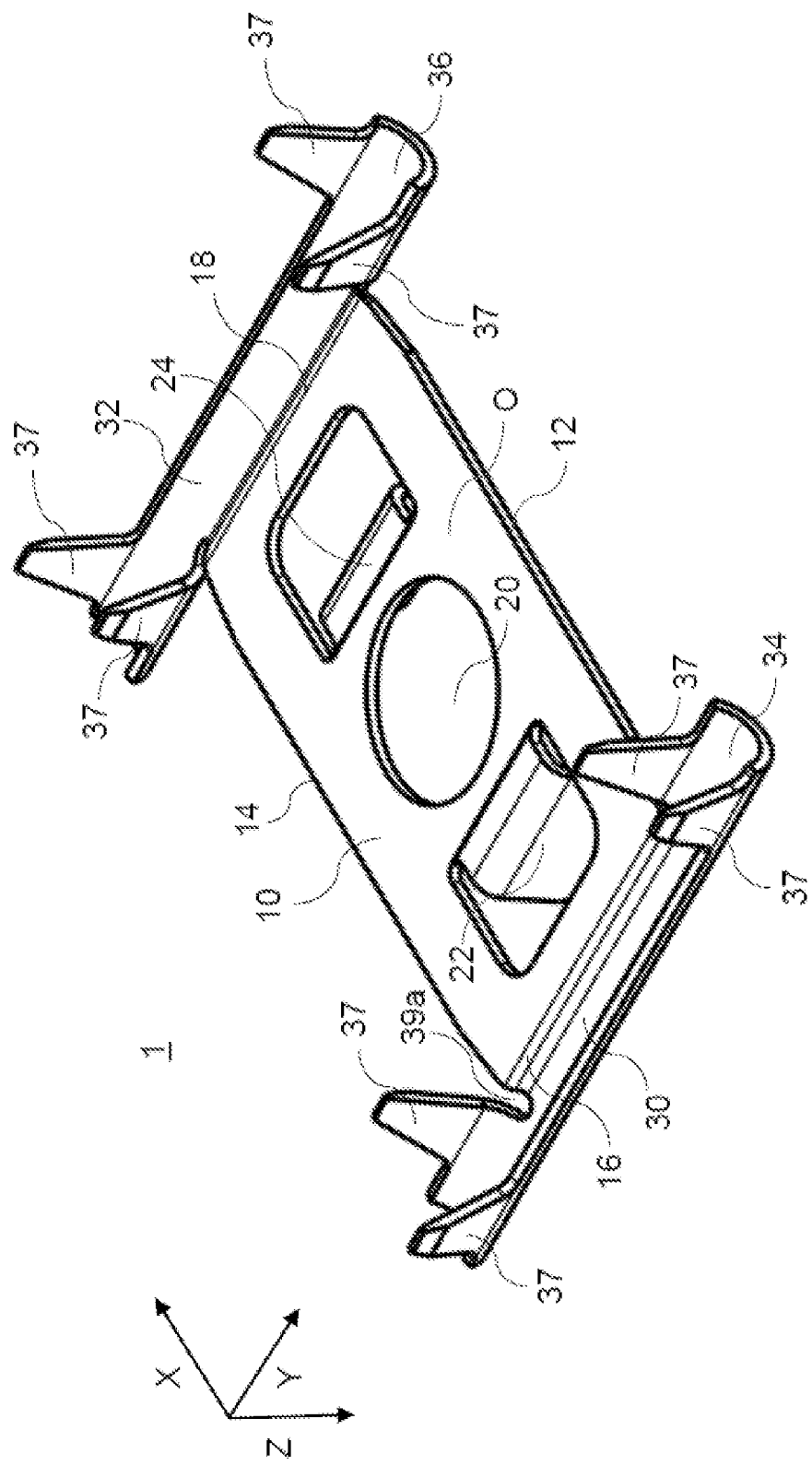
FIG. 5 shows an isometric view of a second embodiment of a grounding clip according to the present invention.
Figure 6:
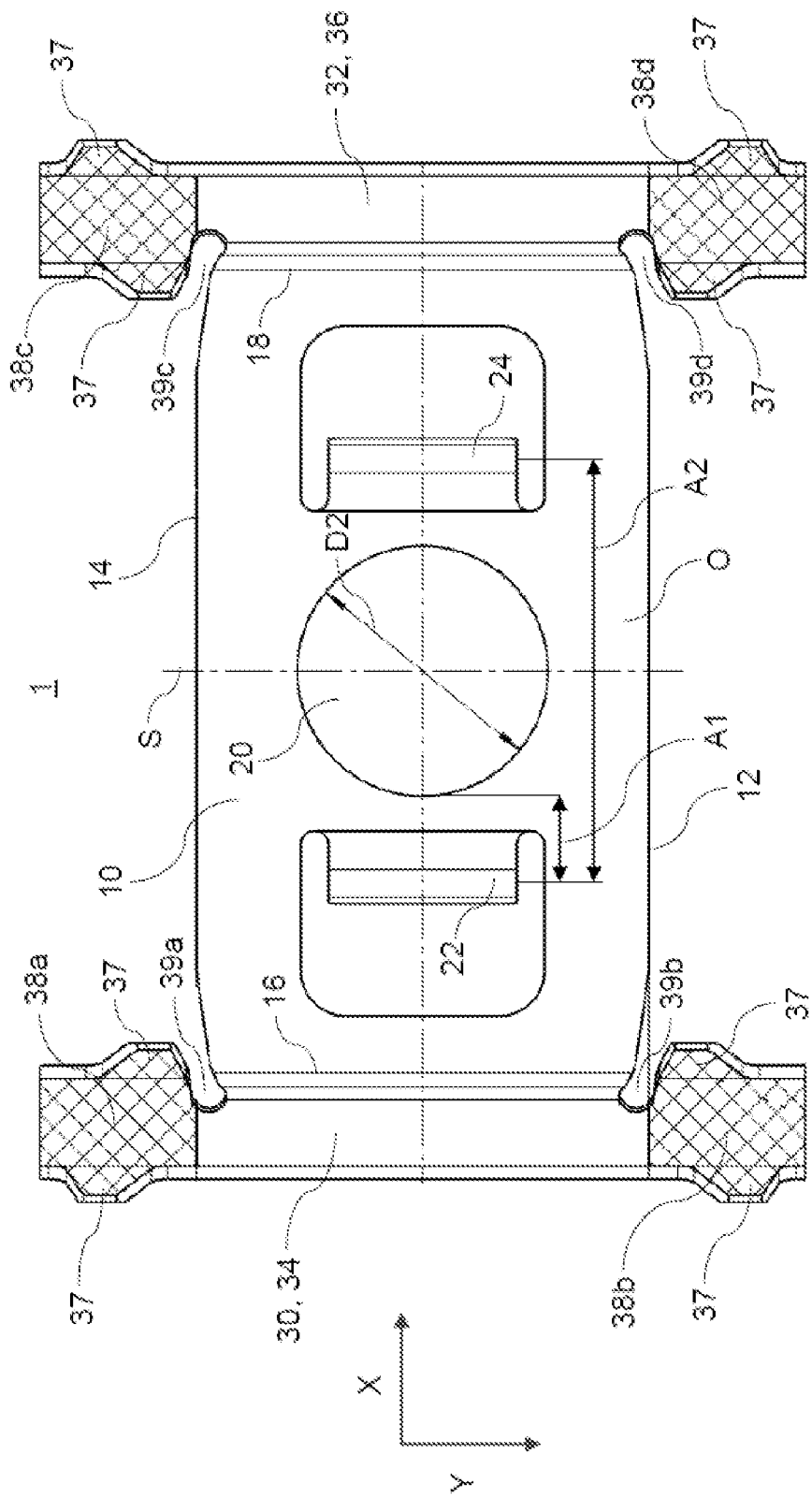
FIG. 6 shows a plan view of the second embodiment.
Figure 7:
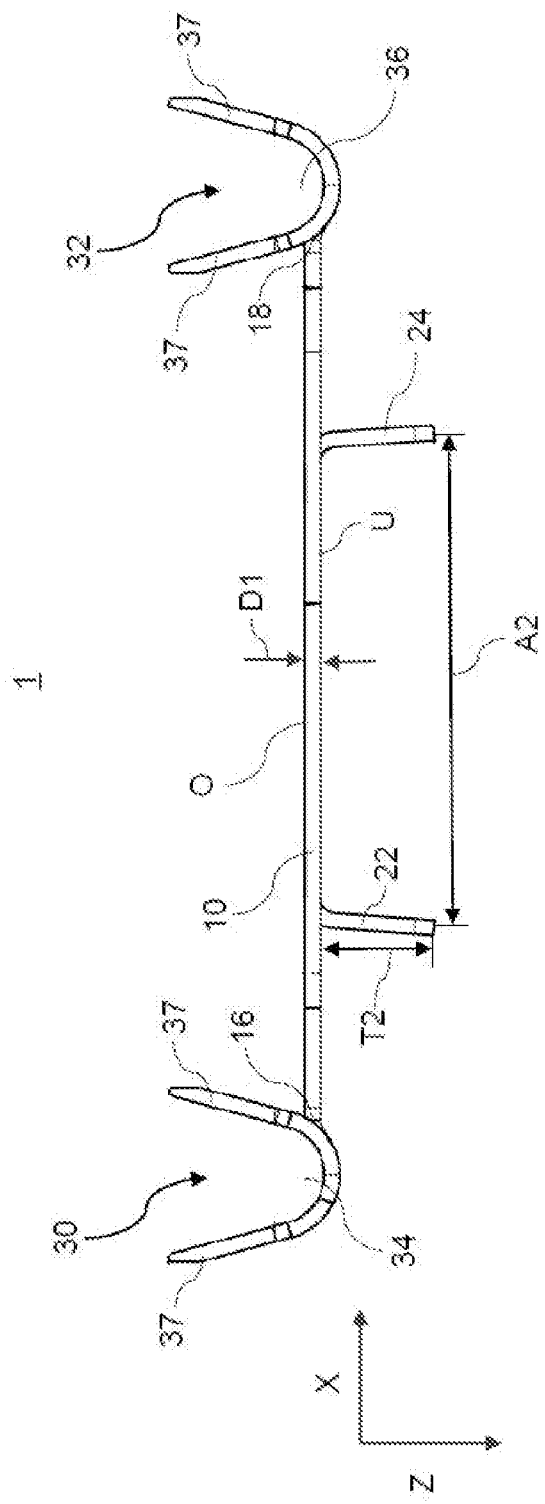
FIG. 7 shows a side view of the second embodiment along a first direction.
Figure 8:
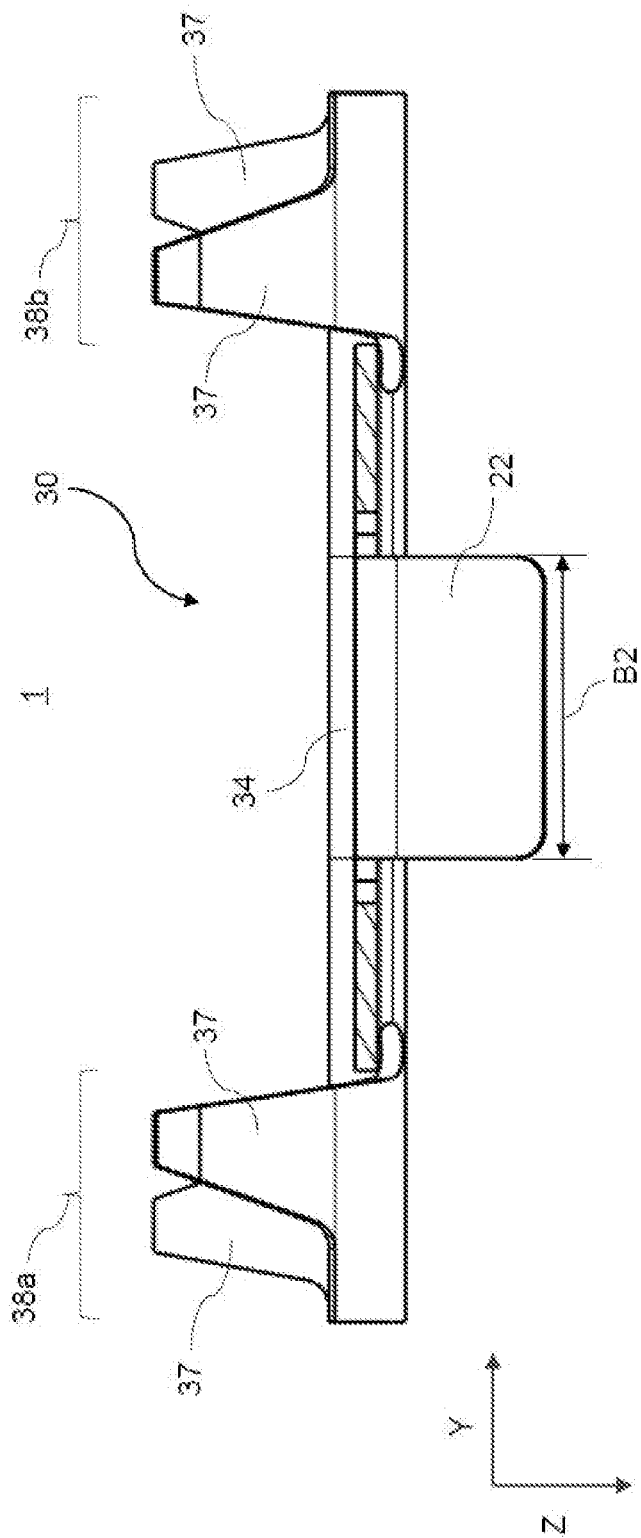
FIG. 8 shows a side view of the second embodiment along a second direction.

FIG. 5 shows a second embodiment of the grounding clip 1. The second embodiment differs from the first embodiment at least in that the first and second tabs 22, 24 are not formed directly at the first or second transverse edges 16, 18 but rather in the center of the plate 10. The two tabs 22, 24 extend at a short first distance A1 in parallel to a respective imaginary tangent on opposite sides of the opening 20 in a direction Z toward the underside U of the plate 10. The two tabs 22, 24 are preferably formed by bending corresponding sections of the plate 10.

In the second embodiment, the first distance A1 between a tab 22, 24 and the corresponding imaginary tangent of the opening 20 is selected such that a second distance A2 between the first and second tabs 22, 24 essentially corresponds to the edge diameter of a bolt nut onto which the grounding clip 1 is arranged and fastened during installation. The bolt nut is preferably an octagonal nut, with which the distance between two opposite edges essentially corresponds to the second distance A2 between the first and second tabs 22, 24. By arranging the two tabs 22, 24 flush above the bolt nut, the grounding clip sits in a torsion-proof manner on the bolt nut or the bolt as a fastening means. The bolt in turn is firmly connected to the separate surface, so that a fixed arrangement of the grounding clip on the separate surface is produced.

In both embodiments, the length of the first and second longitudinal edges 12, 14 is preferably in the range of 15-25 mm, more preferably in the range of 19-21 mm. The length of the first and second transverse edges 16, 18 is preferably in the range of 10-15 mm, more preferably in the range of 12-14 mm.

In the first embodiment, the second distance A2 between the first and second tabs 22, 24 is in the range of 16-22 mm, more preferably in the range of 18-20 mm. In the second embodiment, the second distance A2 between the first and second tabs 22, 24 is preferably in the range of 8-16 mm, more preferably in the range of 11-13 mm.

The grounding clip 1 of the first and second embodiments is preferably made of an electrically conductive material, in particular metal. The grounding clip 1 was in particular manufactured as a single piece in both embodiments.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Grounding clip
10 Plate
12 First longitudinal edge
14 Second longitudinal edge
16 First transverse edge
18 Second transverse edge
20 Opening
22 First tab
24 Second tab
30 First cable fastening region
32 Second cable fastening region
34 First cable guide
36 Second cable guide
37 Crimp tab
38a, b, c, d First, second, third and fourth crimping regions
39a, b, c, d First, second, third and fourth clearances
A1 First distance
A2 Second distance
B1 First width of the tabs
B2 Second width of the tabs
D1 Thickness of the plate
D2 Diameter of the opening
O Upper side
S Mirror axis
T1 First depth of the tabs
T2 Second depth of the tabs
U Underside
X First direction of the plate
Y Second direction of the plate
Z Direction toward an underside of the plate

What is claimed is:

1. A grounding clip for fastening and electrically contacting at least two cables to a separate surface, the grounding clip comprising:
    a plate having a first longitudinal edge and a second longitudinal edge opposite the first longitudinal edge, wherein the first and second longitudinal edges extend in a first direction of the plate, and a first transverse edge and a second transverse edge opposite the first transverse edge, wherein the first and second transverse edges extend perpendicularly to the first and second longitudinal edges in a second direction of the plate;
    a first cable fastening region for fastening and electrically contacting a first cable to the plate, wherein the first cable fastening region extends along the first transverse edge;
    a second cable fastening region for fastening and electrically contacting a separate second cable to the plate, wherein the second cable fastening region extends along the second transverse edge;
    an opening arranged between the first and second cable fastening regions for inserting a fastener, wherein the opening is centered between the first and second cable fastening regions;
    a first tab extending between the first and second cable fastening regions in parallel to the first transverse edge and perpendicularly to a plane of the plate in a direction of an underside of the plate; and
    a second tab extending between the first and second cable fastening regions in parallel to the second transverse edge and perpendicularly to the plane of the plate in the direction of the underside of the plate.

2. The grounding clip according to claim 1, wherein the first tab extends along the first transverse edge and the second tab extends along the second transverse edge.

3. The grounding clip according to claim 1, with which the first tab extends at a first distance from the opening between the opening and the first transverse edge and the second tab extends at the first distance from the opening between the opening and the second transverse edge, so that the grounding clip is arrangeable with the first and second tabs in a torsion-proof manner on a part of the fastener that is insertable in the opening.

4. The grounding clip according to claim 1, wherein the opening is circular.

5. The grounding clip according to claim 1, wherein the grounding clip has an electrically conductive material, so that an electrical connection is provided for between at least one fastenable electrical cable and the fastener that is insertable into the opening.

6. The grounding clip according to claim 1, wherein the grounding clip is constructed mirror-symmetrically to a mirror axis, and wherein the mirror axis extends in parallel to the first and second transverse edges through a center point of the opening.

7. The grounding clip according to claim 1, wherein the first and second cable fastening regions each have a cable guide, and wherein at least one first and one second crimping region at opposite ends of the respective cable guide.

8. The grounding clip according to claim 1, wherein the plate is an elongated plate, and wherein the first direction is the longitudinal direction of the plate.

9. An assembly, comprising:
a separate surface; and
a grounding clip that fastens and electrically contacts at least two cables to the separate surface such that the two cables are connected to ground, the grounding clip comprising:
a plate having a first longitudinal edge and a second longitudinal edge opposite the first longitudinal edge, wherein the first and second longitudinal edges extend in a first direction of the plate, and a first transverse edge and a second transverse edge opposite the first transverse edge, wherein the first and second transverse edges extend perpendicularly to the first and second longitudinal edges in a second direction of the plate,
a first cable fastening region for fastening and electrically contacting a first cable to the plate, wherein the first cable fastening region extends along the first transverse edge,
a second cable fastening region for fastening and electrically contacting a separate second cable to the plate, wherein the second cable fastening region extends along the second transverse edge,
an opening arranged between the first and second cable fastening regions for inserting a fastener, wherein the opening is centered between the first and second cable fastening regions,
a first tab extending between the first and second cable fastening regions in parallel to the first transverse edge and perpendicularly to a plane of the plate in a direction of an underside of the plate, and
a second tab extending between the first and second cable fastening regions in parallel to the second transverse edge and perpendicularly to the plane of the plate in the direction of the underside of the plate,
the separate surface, the grounding clip being connected to the separate surface such that the two cables are connected.

10. The assembly according to claim 9, wherein the grounding clip is attached to the surface by the fastener which extends through the opening.

11. The assembly according to claim 9, wherein the separate surface is part of a motor vehicle body.

12. A grounding clip for fastening and electrically contacting at least two cables to a separate surface, the grounding clip comprising:
a plate having a first longitudinal edge and a second longitudinal edge opposite the first longitudinal edge, wherein the first and second longitudinal edges extend in a first direction of the plate, and a first transverse edge and a second transverse edge opposite the first transverse edge, wherein the first and second transverse edges extend perpendicularly to the first and second longitudinal edges in a second direction of the plate;
a first cable fastening region for fastening and electrically contacting a first cable to the plate, wherein the first cable fastening region extends along the first transverse edge;
a second cable fastening region for fastening and electrically contacting a separate second cable to the plate, wherein the second cable fastening region extends along the second transverse edge;
an opening arranged between the first and second cable fastening regions for inserting a fastener, wherein the opening is centered between the first and second cable fastening regions;
a first tab extending between the first and second cable fastening regions in parallel to the first transverse edge and perpendicularly to a plane of the plate in a direction of an underside of the plate; and
a second tab extending between the first and second cable fastening regions in parallel to the second transverse edge and perpendicularly to the plane of the plate in the direction of the underside of the plate,
wherein at least one of:
the first tab extends at a first distance from the opening between the opening and the first transverse edge and the second tab extends at the first distance from the opening between the opening and the second transverse edge, so that the grounding clip is arrangable with the first and second tabs in a torsion-proof manner on a part of the fastener that is insertable in the opening;
the opening is circular; and
the grounding clip is constructed mirror-symmetrically to a mirror axis, and the mirror axis extends in parallel to the first and second transverse edges through a center point of the opening.

13. The grounding clip according to claim 12, wherein the first tab extends at the first distance from the opening between the opening and the first transverse edge and the second tab extends at the first distance from the opening between the opening and the second transverse edge, so that the grounding clip is arrangable with the first and second tabs in a torsion-proof manner on the part of the fastener that is insertable in the opening.

14. The grounding clip according to claim 12, wherein the opening is circular.

15. The grounding clip according to claim 12, wherein the grounding clip is constructed mirror-symmetrically to the mirror axis, and the mirror axis extends in parallel to the first and second transverse edges through the center point of the opening.

* * * * *